(12) United States Patent
Raikar et al.

(10) Patent No.: US 10,587,141 B2
(45) Date of Patent: Mar. 10, 2020

(54) INTELLIGENT BATTERY CHARGING SYSTEM AND METHOD

(71) Applicant: Sling Media Pvt Ltd, Bangalore (IN)

(72) Inventors: Yatish J. Naik Raikar, Bangalore (IN); Varunkumar B. Tripathi, Bangalore (IN); Arun Pulasseri Kalam, Bangalore (IN)

(73) Assignee: Sling Media PVT Ltd, Bangalore (IN)

( * ) Notice: Subject to any disclaimer, the term of this patent is extended or adjusted under 35 U.S.C. 154(b) by 185 days.

(21) Appl. No.: 15/454,888

(22) Filed: Mar. 9, 2017

(65) Prior Publication Data

US 2018/0262024 A1    Sep. 13, 2018

(51) Int. Cl.
*H02J 7/00* (2006.01)
*H02J 7/04* (2006.01)

(52) U.S. Cl.
CPC ............ *H02J 7/007* (2013.01); *H02J 7/042* (2013.01); *H02J 7/0077* (2013.01); *H02J 7/0091* (2013.01); *H02J 7/044* (2013.01); *H02J 7/045* (2013.01); *H02J 7/047* (2013.01); *H02J 2007/0096* (2013.01); *Y02B 40/90* (2013.01)

(58) Field of Classification Search
CPC ................................ H02J 7/008; H02J 7/1453
USPC ................. 320/114, 132, 134, 152, 153, 162
See application file for complete search history.

(56) References Cited

U.S. PATENT DOCUMENTS

2015/0137741 A1*  5/2015  Gurries ................. H02J 7/0073
                                                          320/107
2017/0070061 A1*  3/2017  Barsukov .............. H02J 7/0077

* cited by examiner

*Primary Examiner* — Edward Tso
*Assistant Examiner* — Aaron Piggush
(74) *Attorney, Agent, or Firm* — Seed IP Law Group LLP

(57) ABSTRACT

An intelligent battery charging system for improving battery safety, battery longevity, and battery charging efficiency. The intelligent battery charging system includes a memory that is arranged to store an intelligent battery controller system. The intelligent battery controller system is executable by a processor and is in communication with a device state sensor, a battery temperature sensor, one or more current sensors, and a battery charge level sensor. The intelligent battery controller system is configured to monitor, via the battery temperature sensor, a temperature of the battery for a mobile device and apply one or more of a plurality of remedial actions to lower the temperature of the battery when a battery temperature above a certain threshold is measured.

25 Claims, 6 Drawing Sheets

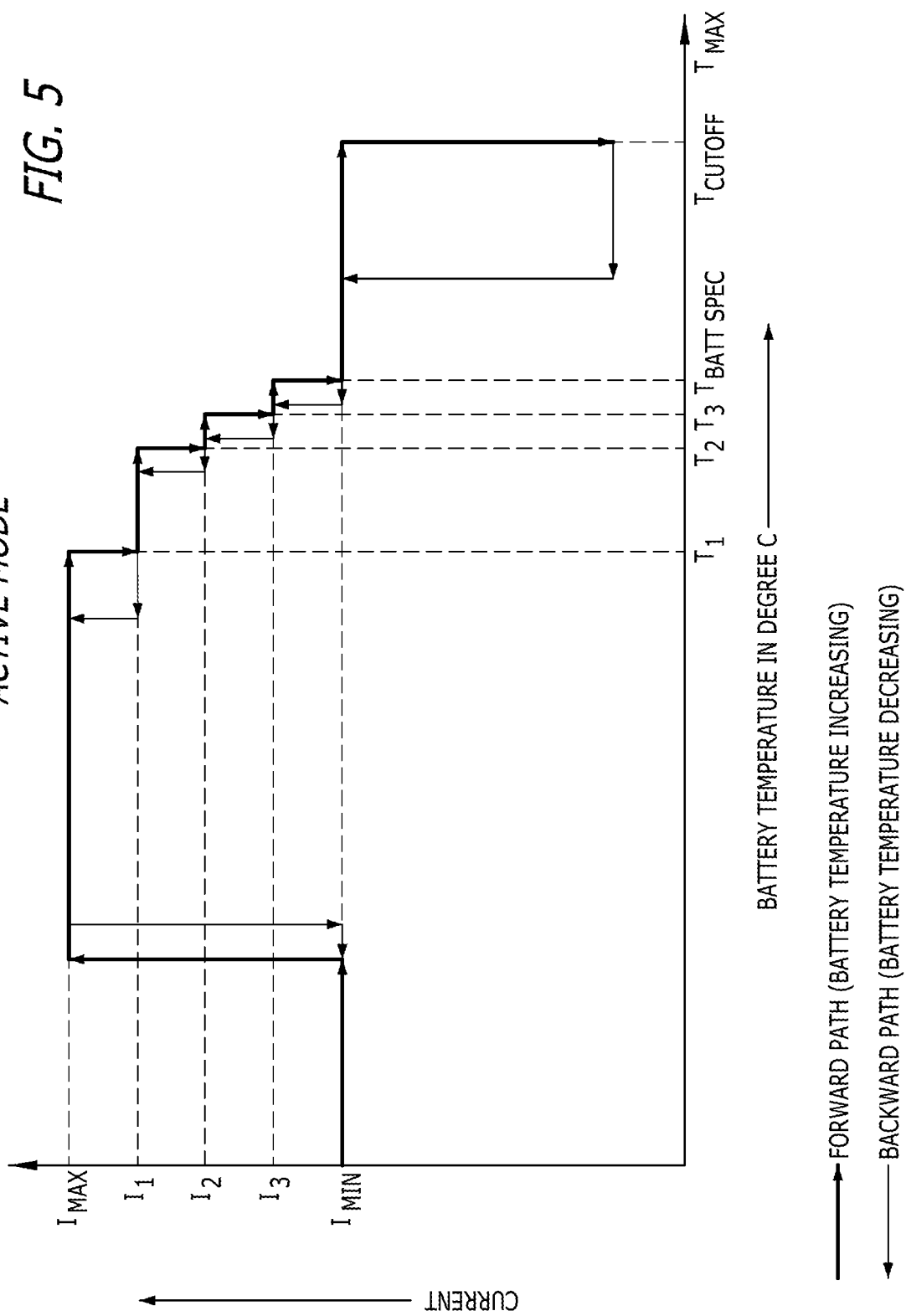

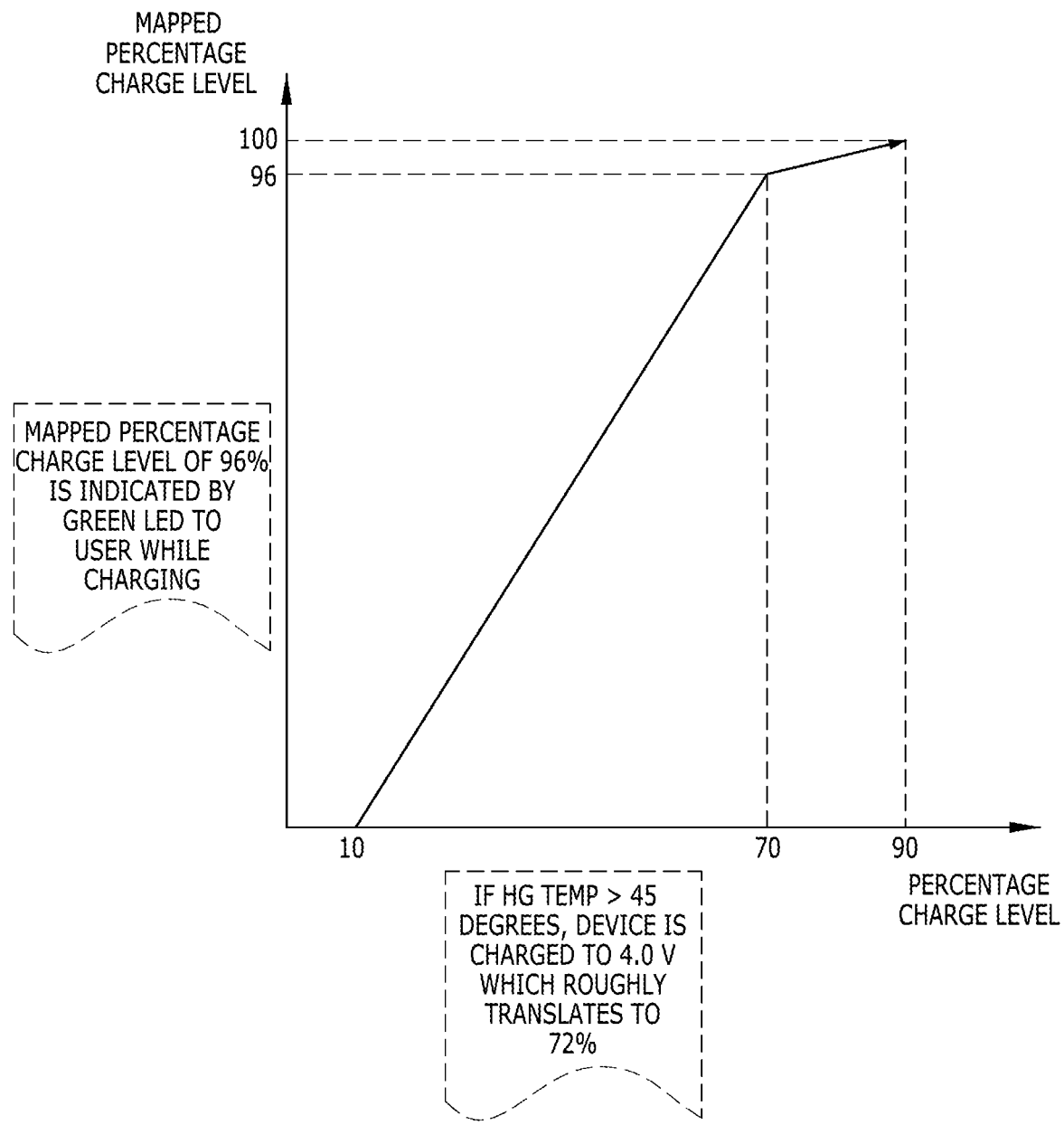

INTELLIGENT BATTERY CHARGING SYSTEM AND METHOD

BACKGROUND

Technical Field

The present disclosure relates generally to a battery charging system and method, and more particularly, but not exclusively, to an intelligent battery charging system and method to improve battery safety and longevity.

Description of the Related Art

The proliferation of electronic mobile devices appears to be growing at an ever increasing rate. Many of these electronic mobile devices rely on rechargeable batteries as a source of power. For example, Lithium-Ion batteries are a frequent choice for powering such mobile devices.

One such electronic mobile device, the HopperGO, enables users of the device to carry their DVR (Digital Video Recorder) content with them. The users may transfer content from their set-top-box (DVR) to the mobile device via USB (Universal Serial Bus) and watch the content later by connecting over WiFi (a wireless Internet connection protocol). As with many mobile devices, the HopperGO comes with a chargeable Lithium ion battery.

Notably, there are several limitations that exist with respect to rechargeable batteries (such as rechargeable Lithium ion batteries) and their use. These limitations include, by way of example only, (1) manufacturer limitations, (2) system limitations, and (3) charging limitations.

Battery manufacturer limitations for a certain battery may recite, for example, the following limitations: (1) the battery should not be charged or discharged at a temperature of more than 60° C. or less than 0° C.; and (2) the battery may only be charged to a voltage of 4.0V when the temperature is above 45° C.

With respect to battery system limitations, system limitations result from the interaction of the battery and the mobile device that is being powered. According to one example system limitation, setting a constant charge current for charging the battery will result in either (1) the charge time taking an unnecessary long time, if charge current is set low or (2) the mobile device becoming too hot, if charge current is set too high. If the mobile device becomes too hot, the charge level may have to be clamped or the mobile device may have to be shutdown, otherwise the battery may potentially catch fire or even explode.

Referring now to battery charging limitations, charging limitations may exist with respect to battery longevity and the length of time required to charge across certain battery charge percentage ranges. It is desirable to maintain battery longevity and battery charging efficiency. Charging limitations over certain battery charge percentage levels can negatively affect these goals.

Notably, the overcharging of a battery for a mobile device is a dangerous event that may result in the battery catching fire or even exploding. Such an event may result in serious injury to people in the area, as well as the potential damage to buildings or structures in which such an event occurs. Furthermore, a battery catching fire or exploding may result in the battery user's house catching on fire. Moreover, if such an event were to occur on an airplane, an emergency condition could be created due to the overcharging of the battery.

Accordingly, there is a continuing need in the art to minimize or eliminate these battery safety and longevity issues that may arise due to manufacturer limitations, battery system limitations, and battery charging limitations. It is with respect to these and other considerations that the embodiments described herein have been made.

Notably, all of the subject matter discussed in this section is not necessarily prior art and should not be assumed to be prior art merely as a result of its discussion in this section. Accordingly, any recognition of problems in the prior art discussed in this section or associated with such subject matter should not be treated as prior art unless expressly stated to be prior art. Instead, the discussion of any subject matter in this section should be treated as part of the identification of the technological problem to be overcome, which in and of itself may also be inventive.

BRIEF SUMMARY

The present disclosure is direct towards an intelligent battery charging system and method for improving battery safety, battery longevity, and battery charging efficiency. At least one implementation the intelligent battery charging system includes a memory that is arranged to store an intelligent battery controller system. The intelligent battery controller system is executable by a processor and is in communication with a device state sensor, a battery temperature sensor, one or more current sensors, and a battery charge level sensor.

The intelligent battery controller system is configured to monitor, via the device state sensor, a present device state of the mobile device out of a plurality of device states; identify the present device state of the mobile device; and apply an associated current profile out of a plurality of current profiles that is associated with the identified present device state. Additionally, the intelligent battery controller system is configured to monitor, via the one or more current sensors, a charging current being received at a battery of the mobile device, a power drive current being received at the processor of the mobile device, and a power supply current being received at the mobile device from an external power source. The intelligent battery controller system is also configured to monitor, via the battery temperature sensor, a temperature of the battery for the mobile device and apply one or more of a plurality of remedial actions to lower the temperature of the battery when a battery temperature above a threshold temperature is measured. Moreover, the intelligent battery controller system is configured to monitor, via the battery charge level sensor, a percentage charge level of the battery and apply a percentage charge level mapping scheme that (1) indicates to a user that the percentage charge level is 0% when the percentage charge level is actually a predefined lower threshold that is higher than 0% and (2) indicates to a user that the percentage charge level is 100% when the percentage charge level is actually a predefined upper threshold that is lower than 100%.

In some embodiments of the intelligent battery charging system, the plurality of device states include device state-idle, device state-active viewing, device state-active USB transfer, device state-active WiFi streaming, or combinations thereof. In such an embodiment, each device state of the mobile device out of the plurality of device states has a different level of power drive current associated with an active function of the present device state. In at least one such embodiment, each of the plurality of current profiles has a different level of power supply current. In some embodiments, the plurality of current profiles each have a different level of power drive current that is received at the processor, and the plurality of current profiles each have an equal charging current that is received at the battery.

In another aspect of some embodiments, the plurality of remedial actions to lower the temperature of the battery include: (1) charging the mobile device to a lower percentage charge level than 100%, (2) stopping the charging of the battery of the mobile device while still maintaining power supply current to support presently active functions of the mobile device, (3) disabling all external communications while still supporting presently active internal functions, (4) shutting down the mobile device, or (5) combinations thereof. In such an embodiment of the intelligent battery charging system, the system monitors a temperature of the battery after instituting the remedial action, waits for the temperature to drop a predetermined number of degrees, and then reverses the remedial action. Continuing, in at least one such embodiment, the predetermined number of degrees is in a range from one to five degrees.

Referring now to another aspect, in some embodiments of the intelligent battery charging system the predefined lower threshold is in the range of 5% to 15%. Continuing, in some such embodiments, the predefined lower threshold is 10%. In still another aspect of some embodiments, the intelligent battery charging system has a predefined upper threshold in the range of 85% to 95%. In some such embodiments, the predefined upper threshold is 90%. In at least one embodiment of the intelligent battery controller system, the percentage charge level mapping scheme shuts down the mobile device when the charge level reaches the predefined lower threshold. Additionally, in at least one embodiment of the intelligent battery controller system, the percentage charge level mapping scheme halts charging when the charge level reaches the predefined upper threshold.

In another implementation, the present disclosure is direct towards an intelligent battery charging method for improving battery safety, battery longevity, and battery charging efficiency. The intelligent battery charging method may include providing a memory that is configured to store an intelligent battery controller system, the intelligent battery controller system executable by a processor, wherein the intelligent battery controller system is in communication with a device state sensor, a battery temperature sensor, one or more current sensors, and a battery charging sensor.

The intelligent battery charging method also includes monitoring, via the device state sensor, a present device state of the mobile device; identifying the present device state of the mobile device; applying an associated current profile that is associated with the identified present device state; monitoring, via the one or more current sensors, a charging current being received at a battery of the mobile device, a power drive current being received at the processor of the mobile device, and a power supply current being received at the mobile device from an external power source; monitoring, via the battery temperature sensor, a temperature of the battery for the mobile device; and applying one or more of a plurality of remedial actions to lower the temperature of the battery when a battery temperature above a threshold temperature is measured.

In some embodiments, intelligent battery charging method also includes monitoring, via the battery charging sensor, a percentage charge level of the battery; and applying a charge mapping scheme that indicates to a user that (1) the percentage charge level is 0% when the percentage charge level is actually a predefined lower threshold that is higher than 0% and (2) the percentage charge level is 100% when the percentage charge level is actually a predefined upper threshold that is lower than 100%.

Still another embodiment of an intelligent battery charging system is also disclosed for improving battery safety, battery longevity, and battery charging efficiency. In at least one implementation, the intelligent battery charging system includes a memory that is configured to store an intelligent battery controller system. The intelligent battery controller system is executable by a processor and is in communication with a device state sensor, a battery temperature sensor, and one or more current sensors.

The intelligent battery controller system is configured to monitor, via the device state sensor, a present device state of the mobile device out of a plurality of device states; identify the present device state of the mobile device; and apply an associated current profile out of a plurality of current profiles that is associated with the identified present device state. Additionally, the intelligent battery controller system is configured to monitor, via the one or more current sensors, a charging current being received at a battery of the mobile device, a power drive current being received at the processor of the mobile device, and a power supply current being received at the mobile device from an external power source. Continuing, the intelligent battery controller system is also configured to monitor, via the battery temperature sensor, a temperature of the battery for the mobile device and apply one or more of a plurality of remedial actions to lower the temperature of the battery when a battery temperature above a threshold temperature is measured.

Yet another embodiment of an intelligent battery charging system is also disclosed for improving battery longevity, and battery charging efficiency. In at least one implementation, the intelligent battery charging system includes a memory that is configured to store an intelligent battery controller system. The intelligent battery controller system is executable by a processor and is in communication with a battery charge level sensor.

Additionally, the intelligent battery controller system is configured to monitor, via the battery charge level sensor, a percentage charge level of the battery and apply a percentage charge level mapping scheme that (1) indicates to a user that the percentage charge level is 0% when the percentage charge level is actually a predefined lower threshold that is higher than 0% and (2) indicates to a user that the percentage charge level is 100% when the percentage charge level is actually a predefined upper threshold that is lower than 100%. In at least one embodiment of the intelligent battery controller system, the percentage charge level mapping scheme shuts down the mobile device when the percentage charge level reaches the predefined lower threshold. Additionally, in at least one embodiment of the intelligent battery controller system, the percentage charge level mapping scheme halts charging when the percentage charge level reaches the predefined upper threshold.

These features with other technological improvements, which will become subsequently apparent, reside in the details of construction and operation as more fully described hereafter and claimed, reference being had to the accompanying drawings forming a part hereof.

BRIEF DESCRIPTION OF THE SEVERAL VIEWS OF THE DRAWINGS

The present application will be more fully understood by reference to the following figures, which are for illustrative purposes only. The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

FIG. 5 illustrates a chart of adaptive battery current settings with respect to battery temperature when the mobile device is in active mode.

FIG. 6 illustrates a chart of a percentage charge level mapping scheme.

DETAILED DESCRIPTION

Figure 1:
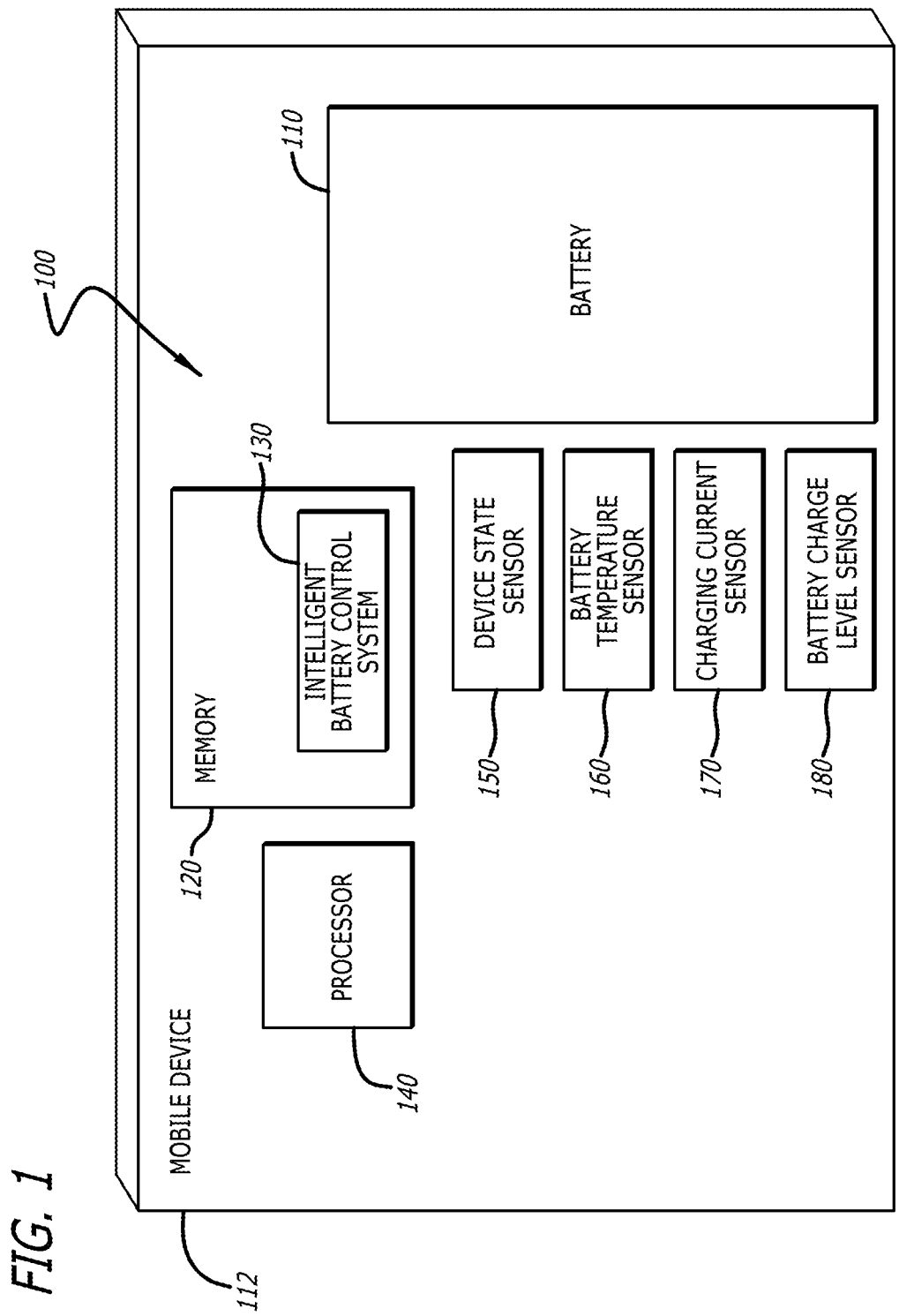
FIG. 1 illustrates a mobile device with a battery and an embodiment of the intelligent battery charging system.

Persons of ordinary skill in the art will understand that the present disclosure is illustrative only and not in any way limiting. Other embodiments and various combinations of the presently disclosed system and method readily suggest themselves to such skilled persons having the assistance of this disclosure.

Each of the features and teachings disclosed herein can be utilized separately or in conjunction with other features and teachings to provide an intelligent battery charging system and method to improve battery safety and longevity, as well as charging efficiency. Representative examples utilizing many of these additional features and teachings, both separately and in combination, are described in further detail with reference to attached FIGS. 1-6. This detailed description is intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present system and method. However, it will be apparent to one skilled in the art that these specific details are not required to practice the teachings of the present system and method. Also others, methods, and systems may also be used.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm, as described herein, is a sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," "configuring," or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present application also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

In one or more implementations of the intelligent battery charging system and method, the charging current and/or the power supply current are modified based on the temperature of the battery and the present state of the mobile device that the battery is charging to improve battery safety and longevity. Additionally, in one or more implementations, the intelligent battery charging system and method maps and enforces a modified range of battery percentage charge levels, which results in improved battery charging efficiency and battery longevity.

Referring now to FIG. 1, at least one embodiment of the intelligent battery charging system 100 improves safety, longevity, and charging efficiency of a battery 110 in a mobile device 112. At least one implementation the intelligent battery charging system and method 100 includes a memory 120 that is arranged to store an intelligent battery controller system 130. The intelligent battery controller system 130 is executable by a processor 140 and is in communication with a device state sensor 150, a battery temperature sensor 160, one or more current sensors 170, and a battery charge level sensor 180.

Device State-Based Charging:

The intelligent battery charging system and method 100 ensures improved charging efficiency of the battery 110 and at the same time ensures that the battery and system specifications are not violated. Notably, a mobile device 112 may consume different amounts power under various conditions. For example, the power consumed when the mobile device 112 is active is higher than the power consumed when the mobile device 112 is idle. Examples of an active mobile device include when content is live streaming, when content transfer via USB is occurring, when locally stored content is being actively viewed, and the like. An example of an idle mobile device includes when the mobile device is powered on but no functions are active.

An active state is a state in which any of one or more processors 140 are in an operational mode. Most mobile devices have at least two processors, (1) a radio processor chip, which is also called a cellular or wireless chip, and (2) a system processor chip. The radio processor chip is active anytime data is being transferred to or from the mobile device. The system processor chip is active whenever the mobile device is carrying out a local operation, such as playing a pre-loaded video game, taking pictures, listening to pre-loaded music, data calculations, and the like. Often both processor chips are active, such as when viewing live streamed video, or playing a multiuser live video game.

An idle state is a state in which no processors 140 in the mobile device 112 are in an operational mode. In one idle state the mobile device 112 may be shut down and not charging the battery 110. In another idle state the mobile device 112 may be shut down but the battery 110 may be receiving charging current. In some embodiments, the mobile device 112 may be considered to be in an idle state when the mobile device is in a sleep mode, depending on the status of the processors 140 in the mobile device.

Figure 2:
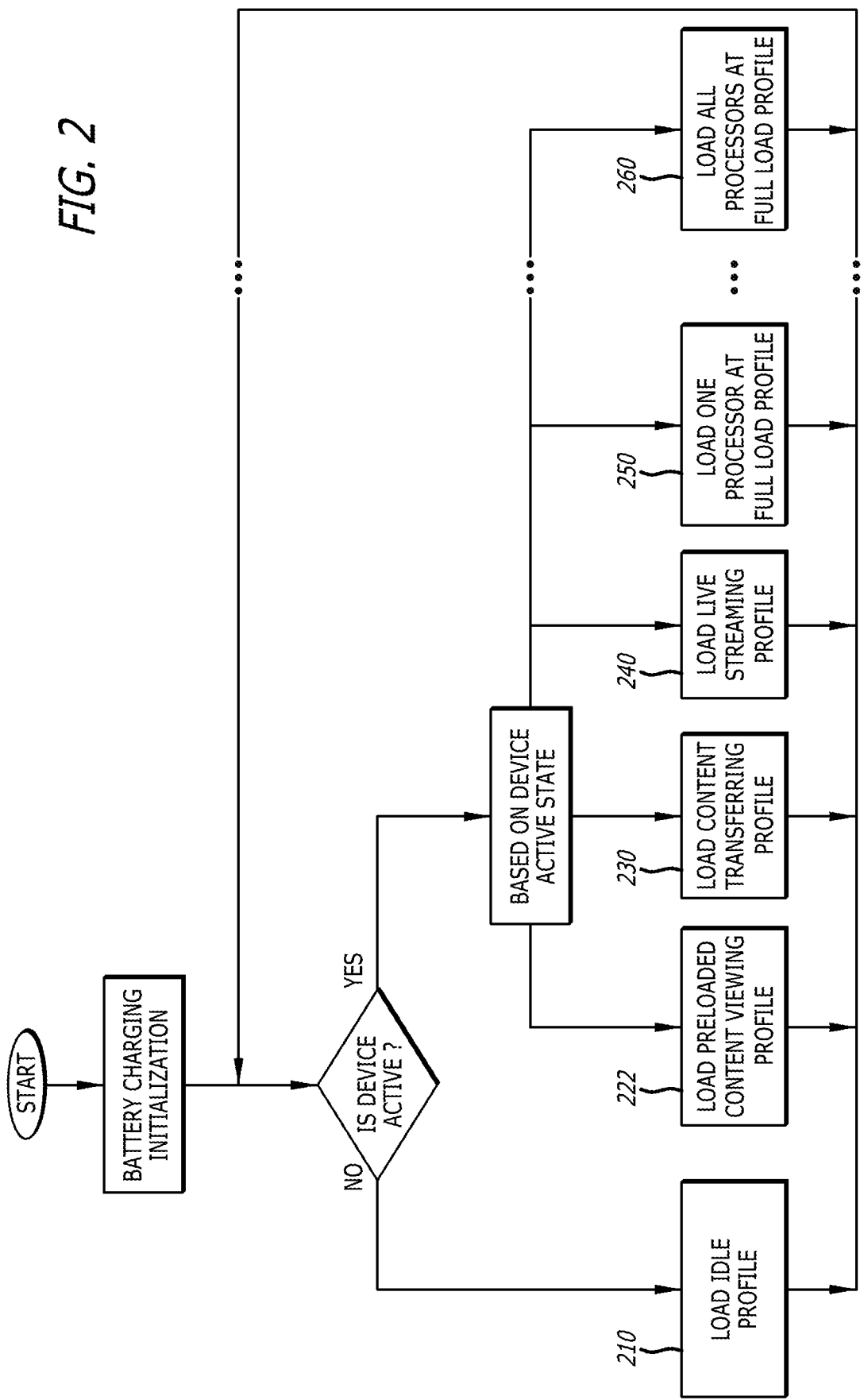
FIG. 2 illustrates a logic flow diagram for charging mode configuration in response to the mobile device activity status.

Referring now to FIG. 2, the intelligent battery charging system 100 monitors the device state to determine whether the mobile device 112 is idle or active, and if active, what type of functionality is enabled. In this manner, if the mobile device 112 is active, the intelligent battery charging system 100 monitors which mobile device functions and/or activities are active and their associated power requirements to the battery based on the state of the mobile device. The intelligent battery charging system 100 then applies a selected current profile based on the active state of the mobile device 112.

The current required by the battery 110 and the processor 140 of the mobile device 112 varies based on the operations being performed, e.g., idle, active-viewing, active-transferring, active-WiFi streaming, and the like. Accordingly, as shown in FIG. 2, the device state of idle results in the loading of Idle Profile 210, the device state of active viewing results in the loading of Pre-loaded Content Viewing Profile 220, the device state of active transferring results in the loading of Content Transferring Profile 230, and the device state of active streaming results in the loading of Live Streaming Profile 240. In other embodiments that have additional device states with corresponding power supply current requirements, additional corresponding profiles will be implemented.

In some embodiments that have additional device states with corresponding power supply current requirements, a single processor is active in the profile, such as Single Processor at Full Load Profile 250. In still other embodiments that have additional device states with corresponding power supply current requirements, multiple processors are used in the profile, such as Multiple Processors at Full Load Profile 260. In some embodiments, mobile devices 112 may include dual-core processors, quad-core processors, octa-core processors, and the like.

Additional device state profiles may include profiles that correspond to any active device state that has a unique power supply current requirement, such as active Bluetooth operations, active cellular operations, active short message service operations, active interactive video game play, active music streaming, active playing of locally stored music, active display screen activity, active photograph capture, active photograph display, active website data upload, and the like. Furthermore, every different application that is operational on the mobile device may have a separate device state profile if each application has a unique power supply current requirement.

With respect to the HopperGO mobile device, during transfer of content from a set-top box or WiFi streaming, the power drive current requirement of the processor 140 increases, whereas when the mobile device 112 is in idle mode the power drive current requirement is decreased. Accordingly, the intelligent battery charging system and method 100 monitors the activity in the HopperGO mobile device 112 and adjusts the power drive current appropriately. The HopperGO mobile device 112 preferably uses a battery manufactured by BAK Battery Co Ltd., Model No: G494251P, Version: A03, with a capacity of 1500 mAH.

Figure 3:
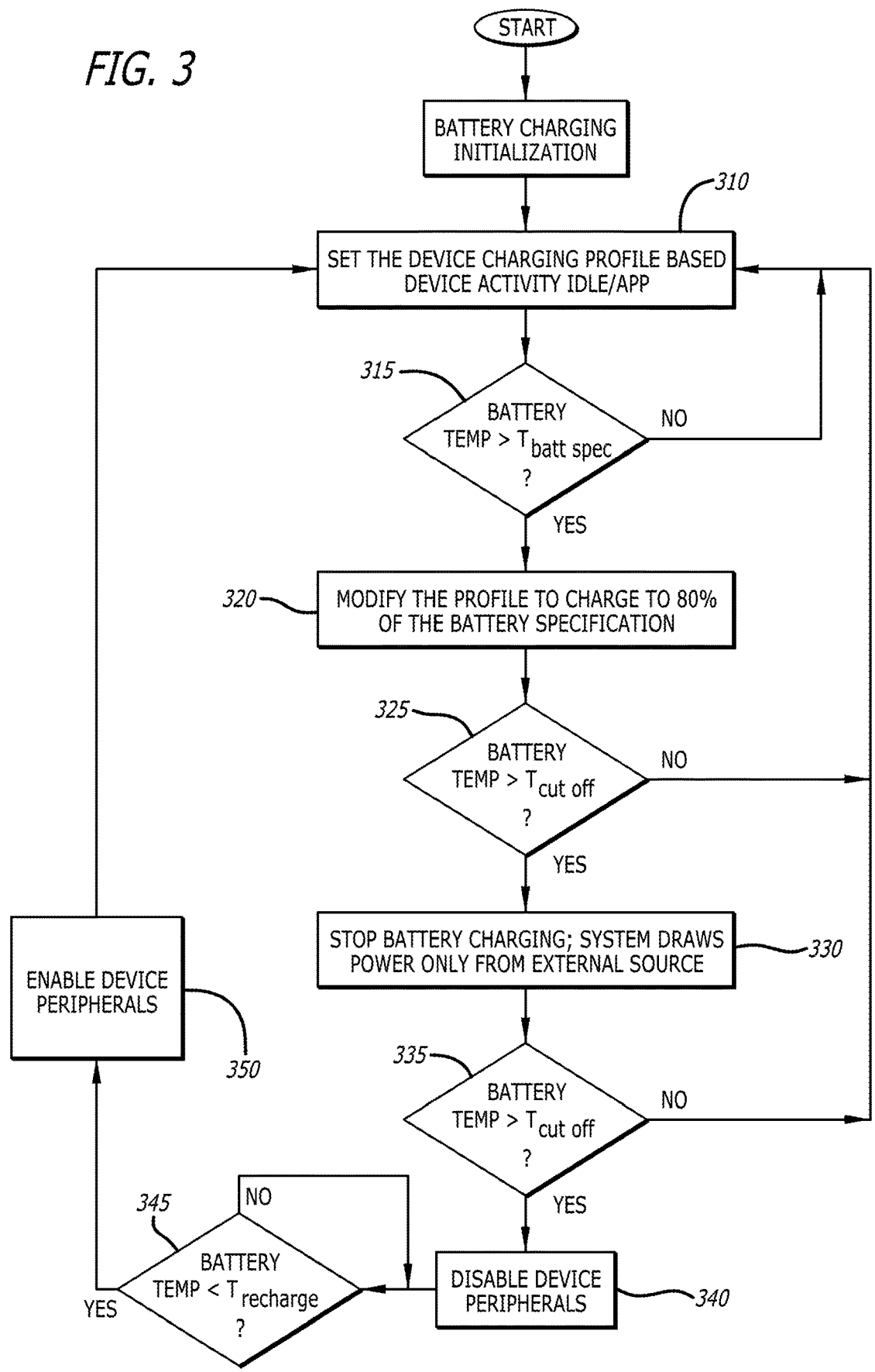
FIG. 3 illustrates a logic flow diagram for temperature based charging in response to the real-time temperature of the battery.

Temperature-Based Charging:

Referring now to FIG. 3, the intelligent battery charging system 100 monitors the battery temperature with respect to battery manufacture limitations and system limitations. At Step 310, the mobile device charging profile is set based on the monitored and identified device activity. Next, at Step 315, the temperature of the battery 110 is measured to determine if there has been an unacceptable rise in battery temperature. The intelligent battery charging system 100 then enacts remedial actions if there has been an unacceptable rise in battery temperature.

In at least one embodiment, the intelligent battery charging system 100 monitors the battery temperature using one or more temperature sensors. For example, in some embodiments, the one or more temperature sensors are placed in one or more locations adjacent to the outside of the battery, at the charge terminals, in the housing of the battery, near processors or other heat-generating components, or in combinations thereof. In simpler mobile devices wherein the battery temperature is more uniform and/or the peak temperature location is easily identified, the intelligent battery charging system 100 may employ only one or a few temperature sensors. However, in more complex mobiles devices having more heat-generating components and more potential for localized temperature peaks, the intelligent battery charging system 100 may employ a larger number of temperature sensors.

Accordingly, in response to a rising battery temperature, one remedial action the intelligent battery charging system and method 100 may take to reduce the battery temperature is to charge the battery 110 to a percentage charge level lower than 100%. A battery 110 tends to increase in heat the longer it is continuously charged. As such, charging the battery 110 to a percentage charge level less than 100% mitigates the temperature reached by the battery 110 during charging. Alternatively or additionally, in response to a battery temperature rising to a defined level, a remedial action the intelligent battery charging system and method 100 may take to reduce the battery temperature is to charge the battery 110 to a lower voltage, e.g., 80% of the 5V set by the battery specification, as shown in Step 320.

After the first remedial action, at Step 325, the temperature of the battery is again measured to determine if the battery temperature is unacceptably high. The intelligent battery charging system 100 then enacts another remedial action if the battery temperature is unacceptably high. For example, the intelligent battery charging system and method 100 may take the remedial action of stopping the charging of the battery 110 while still maintaining sufficient power supply current to support presently active functions of the mobile device 112, shown in Step 330. Lowering the battery temperature by stopping the charging current to the battery 110, while still maintaining power drive current to support presently active functions of the mobile device 112, is a novel approach to ensuring that the mobile device 112 keeps receiving sufficient power supply current from an external source, but that the charging current is reduced to zero so that the charging of the battery 110 is stopped. This approach prevents the battery 110 from heating up any further due to the battery 110 charging or discharging, while ensuring the user does not see any impact on the functionality of the mobile device 112. For example, since the power supply current is maintained, WiFi streaming may continue.

After the second remedial action, at Step 335, the temperature of the battery 110 is again measured to determine if the battery temperature is still unacceptably high. The intelligent battery charging system 100 then enacts yet another remedial action if the battery temperature is still unacceptably high. For example, another remedial action that the intelligent battery charging system 100 may take to lower the battery temperature is to disable all of the external communications, such as WiFi streaming or downloading, USB streaming or download, and the like, while maintaining internal functions of the mobile device 112. In at least one embodiment, this remedial action includes disabling all peripherals of the mobile device 112 (See Step 340).

After the third remedial action, at Step 345, the temperature of the battery 110 is again measured to determine if the battery temperature is still unacceptably high. The intelligent battery charging system 100 then enacts yet another remedial action if the battery temperature is still unacceptably high. For example, still another action that the intelligent battery charging system 100 may take to lower the temperature of the battery 110 in the mobile device 112 is shutting down the mobile device 112. In such an embodiment, the charge current and the power drive current are reduced to zero.

As shown at Step 350 of FIG. 3, the intelligent battery charging system 100 then reverses the remedial action, when the temperature of the battery 110 is measured and it is determined that the battery temperature is no longer unacceptably high.

In another embodiment, the remedial action includes reducing the heat of the processor 140 of the mobile device 112, since in some system architectures, heat from one or more processors 140 in the mobile device 112 may increase the temperature of the battery 110 if the components are positioned next to each other. In at least one implementation, the temperature of the processor 140 is lowered by reducing the power drive current to the processor 140. In another implementation, the temperature of the processor 140 is lowered by halting or pausing one or more of the functions being supported by the processor 140. This will reduce the heating of the battery 110 in two different ways. First, the temperature of the battery 110 will be lowered by reducing the output current of the battery 110, which will reduce the heat generated by the battery 110. Second, the temperature of the battery 110 will be lowered by reducing the heat from the operation of the processor 140, which has the secondary effect of heating the battery 110 and/or any component that is adjacent to the processor 140.

In some embodiments of the intelligent battery charging system 100, the temperature of the battery 110 may be measured at multiple different locations on the battery 110, such as locations that are prone to experience localized increases in temperature. For example, the location of the current input to the battery 110 may be one temperature measurement location, a location where a first processor is located adjacent to the battery 110 may be a second temperature measurement location, and a location where a second processor is located adjacent to the battery 110 may be a third temperature measurement location. Additionally, the intelligent battery charging system 100 may also monitor for increases in battery and/or mobile device temperature due to the environment, such as direct sunlight and/or a hot automobile. Accordingly, the intelligent battery charging system 100 may also implement remedial actions to cool an elevated temperature of the battery 110 and/or mobile device 112 if the cause of the elevated temperature is environmental.

In this manner, the intelligent battery charging system and method 100 acts to ensure the safety of the battery 110 of the mobile device 112 by modifying the charge current and/or the power drive current based on temperature of the battery 110. In one example, as the battery 110 in the mobile device 112 starts heating up, the charge current is reduced to prevent the battery 110 in the mobile device 112 from heating up any further. In another example, as the battery 110 in the mobile device 112 starts heating up, both the charge current and the power drive current are reduced to prevent the mobile device 112 from heating up any further.

Figure 4:
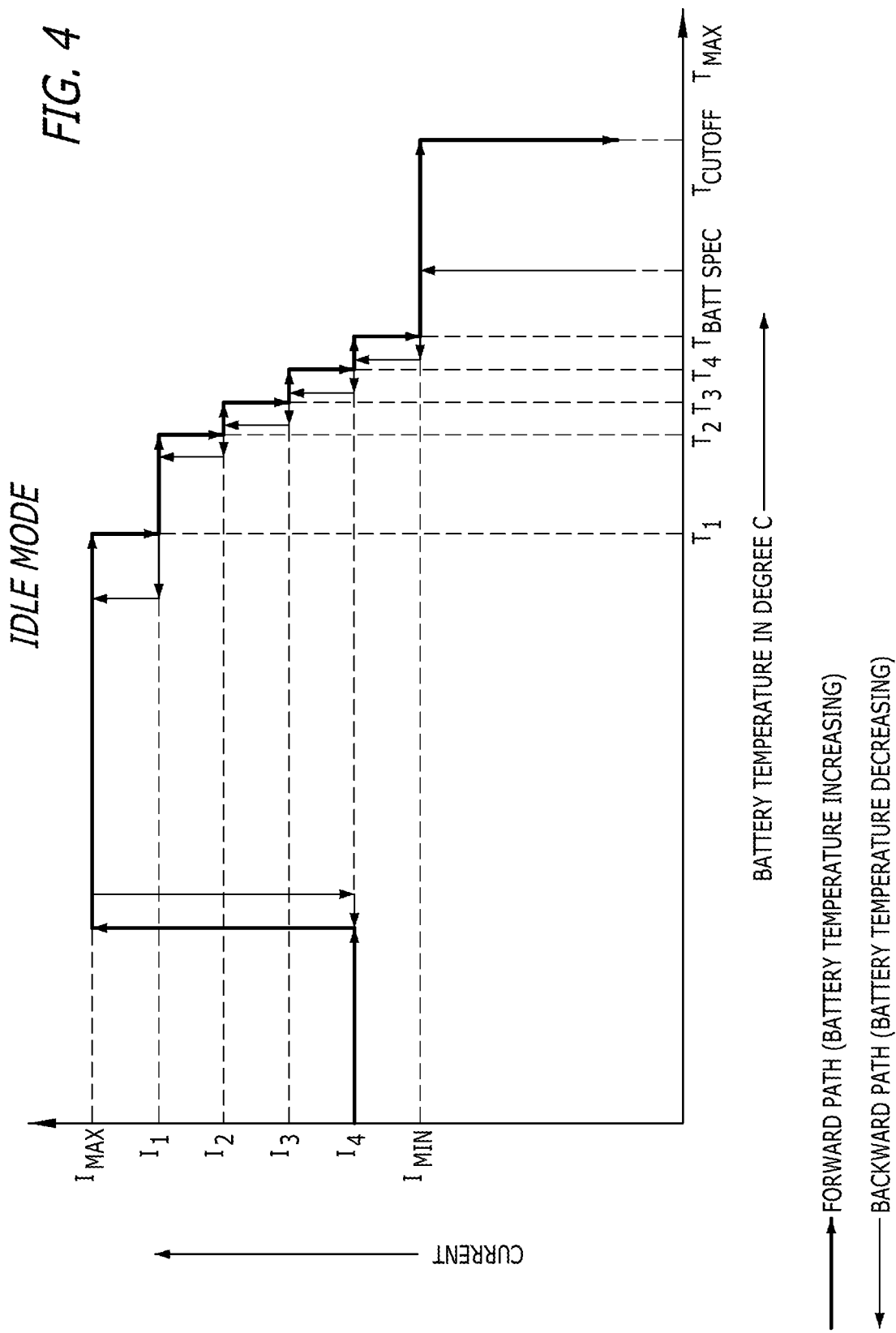
FIG. 4 illustrates a chart of adaptive battery current settings with respect to battery temperature when the mobile device is in idle mode.

Referring now to FIG. 4, the current supplied to the mobile device is shown with respect to the battery temperature in degrees, when the mobile device is in an idle state. Specifically, the forward arrow representing the battery temperature increasing starts at a current level above $I_{MIN}$. The temperature of the battery increases when the current level is increased to $I_{MAX}$. The intelligent battery charging system and method 100 then implements a remedial measure at $T_1$ that reduces the current level from $I_{MAX}$ to $I_1$. Next, the intelligent battery charging system and method 100 implements a remedial measure at $T_2$ that reduces the current level from $I_1$ to $I_2$. Continuing, the intelligent battery charging system and method 100 then implements another remedial measure at $T_3$ that reduces the current level from $I_2$ to $I_3$. Further, the intelligent battery charging system and method 100 then implements still another remedial measure at $T_4$ that reduces the current level from $I_3$ to $I_4$. Next, the intelligent battery charging system and method 100 implements the remedial measure of placing the mobile device 112 in an idle state at $T_{BATT\ SPEC}$ that reduces the current level from $I_4$ to $I_{MIN}$. Finally, the intelligent battery charging system and method 100 implements the remedial measure of shutting down the mobile device 112 at $T_{CUT\ OFF}$ that reduces the current level from $I_{MIN}$ to zero. Along the path of the arrows in FIG. 4, the hysteresis effect may be seen, in which the temperature values of the battery 110 lag behind the changes in the current profiles and remedial actions that are intended to control the temperature values.

Referring now to FIG. 5, the current supplied to the mobile device is shown with respect to the battery temperature in degrees, when the mobile device is in an active state. Specifically, the forward arrow representing the battery temperature increasing starts at a current level equal to $I_{MIN}$. The temperature of the battery increases when the current level is increased to $I_{MAX}$. The intelligent battery charging system and method 100 then implements a remedial measure at $T_1$ that reduces the current level from $I_{MAX}$ to $I_1$. Next, the intelligent battery charging system and method 100 implements a remedial measure at $T_2$ that reduces the current level from $I_1$ to $I_2$. Continuing, the intelligent battery charging system and method 100 then implements another remedial measure at $T_3$ that reduces the current level from $I_2$ to $I_3$. Further, the intelligent battery charging system and method 100 then implements still another remedial measure at $T_{BATT\ SPEC}$ that reduces the current level from $I_3$ to $I_{MIN}$. Next, the intelligent battery charging system and method 100 implements the remedial measure of shutting down the mobile device 112 at $T_{CUT\ OFF}$ that reduces the current level from $I_{MIN}$ to zero. Along the path of the arrows in FIG. 5, the hysteresis effect may be seen, in which the temperature values of the battery 110 lag behind the changes in the current profiles and remedial actions that are intended to control the temperature values.

The minimum power supply current is higher when the mobile device 112 is in active mode because the power drive current is being used to power the active functions of the mobile device 112 via the processor 140, while the charging current is being used to charge the battery 110 of the mobile device 112. Correspondingly, the minimum power supply current is lower while in the idle mode because only charging current is being used to charge the battery 110 of the mobile device 112. In this idle mode embodiment, no power drive current is needed since there are no active functions of the mobile device. In another embodiment, a minimal amount of the power drive current may be used to power nominal functions. In at least one implementation, the power supply current from the external power source is equal to the power drive current to the processor 140 added to the charging current to the battery 110.

Referring again to FIGS. 4 and 5, the first set of arrows (in bold) shows a forward path of the battery temperature increasing, while the second set of arrows show a backwards path of the battery temperature decreasing. The battery temperature decreases when the intelligent battery charging system 100 enacts a remedial action to reduce the battery temperature. Such remedial actions include: (1) halt battery charging at less than 100%; (2) reduce charging current level to the battery to less than the allowed charging current level; (3) halt battery charging prior to completion of the charging while still maintaining power supply current to support active functions/features; (4) disable functions/features of the mobile device 112, such as external communications, and thereby reduce the power supply current, and/or (5) shutting down the mobile device 112 and stopping the power supply current.

In some embodiments, after the intelligent battery charging system 100 enacts one or more remedial actions to reduce the battery temperature, the intelligent battery charging system 100 waits for an actual measured temperature drop, e.g., 5° C., such as from 45° to 40°. In other implementations, actual measured temperature drop is in a range from 1° C. to 5° C. Subsequent to the intelligent battery charging system 100 measuring this temperature drop, the intelligent battery charging system 100 then reverses the remedial action, as shown in Step 350 of FIG. 3. FIGS. 4 and 5 also show the hysteresis effect in which the temperature values of the battery lag behind the changes in the current profiles that are intended to control the temperature values.

In some embodiments that have additional remedial actions, these additional remedial actions may include disabling any functions/features of the mobile device 112 that have a power supply current requirement, such as Bluetooth operations, cellular operations, short message service operations, interactive video game play, music streaming, playing of locally stored music, display screen activity, photograph capture, photograph display, website data upload, and the like. Furthermore, every different application that is operational on the mobile device may be subject to disablement as a remedial action if each application has a power supply current requirement. In some embodiments in which the mobile devices 112 include multiple processors, such as dual-core processors, quad-core processors, octa-core processors, and the like, a remedial action may include shutting down one or more, but not all, of the processors.

Battery Charge Percentage-Based Charging:

Referring now to FIG. 6, in at least one implementation of the intelligent battery charging system and method 100, the intelligent battery charging system and method 100 ensures that the battery 110 of the mobile device 112 is charged and discharged across a specific battery charge percentage range to maintain battery longevity and charging efficiency. For example, if a battery 110 is charged from 0-100%, i.e., charged from completely drained to fully charged, the charge time increases substantially. Otherwise stated, the charging efficiency of the battery is poor near 0% and poor near 100%. Additionally, if a battery 110 is charged over the entire percentage range from 0% to 100% there is a significant reduction in battery life.

Specifically, in one implementation of the intelligent battery charging system and method 100, the intelligent battery charging system and method 100 ensures that the battery 110 of the mobile device 112 is charged and discharged across a percentage charge level range of 10% to 90%. Enforcing the battery 110 of the mobile device 112 to charge and discharge across this reduced percentage charge level range results in improvement of the battery life of the device, particularly at the top end of the charging range, e.g., 90%. Additionally, enforcing the battery 110 of the mobile device 112 to charge and discharge across this reduced percentage charge level range significantly improves charging time, particularly at the bottom end of the charging range, e.g., 10%.

While it is known that battery charging efficiency is poor when a battery is fully discharged or near fully discharged. The intelligent battery charging system and method 100 is unique in that the system does not allow a user to fully discharge the battery. Rather, when the bottom end of the charging range, e.g., 10%, is reached, the mobile device 112 is shut down and the user is informed that the battery was fully discharged. Correspondingly, the intelligent battery charging system and method 100 is unique in that the system does not allow a user to fully charge the battery. Rather, when the upper end of the charging range, e.g., 90%, is reached, the mobile device 112 halts the charging and the user is informed that the battery was fully charged.

In some embodiments, the user is provided with mapped percentage charge levels for appropriate indications to a user instead of actual percentage charge levels. For example, in one embodiment, when the battery percentage charge level reaches a 90% charge, the mobile device 112 indicates to the user that the mobile device 112 is fully charged. Notably, in at least one embodiment, further charging is halted by the intelligent battery charging system 100 when the battery percentage charge level reaches a 90% charge. An example of such a battery percentage charge level mapping scheme is shown in FIG. 6.

Correspondingly, if the battery percentage charge level falls to a 10% charge, the mobile device 112 indicates to the user that the mobile device 112 is at 0% charge. Notably, in at least one embodiment, the mobile device 112 is switched off by the intelligent battery charging system 100 when the battery percentage charge falls to a 10% charge. This percentage charge level mapping, which is enforced by the intelligent battery charging system 100, is performed to improve the number of charge cycles, which in turn improves the battery life.

In another embodiment, the intelligent battery charging system 100 enforces the mobile device 112 to charge and discharge across a battery percentage level charge range of 15% to 85%. In still another embodiment, the intelligent battery charging system 100 enforces the mobile device 112 to charge and discharge across a battery percentage level charge range of 5% to 95%. In yet another embodiment, the intelligent battery charging system 100 enforces the mobile device 112 to charge and discharge across a battery percentage level charge range of 5% to 85%. In still a different embodiment, the intelligent battery charging system 100 enforces the mobile device 112 to charge and discharge across a battery percentage level charge range of 15% to 95%. Accordingly, in various embodiments, the intelligent battery charging system 100 enforces the mobile device 112 to charge and discharge across a battery percentage level charge range of 5% -15% on the lower end of the range to 85%-95% on the upper end of the range.

Various aspects of the systems, methods, functions, steps, features and the like corresponding thereto disclosed herein may be implemented on one or more computer systems using hardware, software, firmware, circuits, or combinations thereof. Hardware, software, firmware, and circuits respectively refer to any hardware, software, firmware, or circuit component. Computer systems referred to herein may refer to any computing device and vice versa (e.g., smart phone, mobile computing device, personal data assistant, tablet computer, laptop computer, desktop computer, other computing device, and the like).

In at least one implementation, each computer system or computing device in the systems described herein or any embodiment of a system disclosed herein may utilize one or more of the following components: a single-core or multi-core hardware processor (e.g., central processing unit or graphics processing unit) on which software instructions are executed (e.g., instructions corresponding to an operating system, an application program, an interpreter such as a virtual machine, or a compiler); a memory associated with and in connection with the hardware processor such as cache or other system memory that stores software instructions or other data that the hardware processor may access for processing; an input device (e.g., mouse, keyboard, touchscreen, and the like); an output device (e.g., display, touchscreen, printer, and the like); a network or communication interface that enables the computer system to communicate over a network or communication protocol; an application program having corresponding software instructions that are executable by a hardware processor. Connections between different computer systems and connections between different computer system components may be wired or wireless.

As another example, in a web application or website embodiment, data representative of a user input may be transmitted to a server (i.e., a computer system) hosting the website for processing and storage in memory. In an application program embodiment, the application may be stored and executed locally on a user's computer system. In other embodiments, one or more components of the application program may be stored and executed on a server and the user's computer system. For example, a user may download the application program from an app store for an Android computing device, Blackberry computing device, Apple computing device, Windows computing device, Samsung computing device, other computing device, and the like. Execution of the application program on the user's computing device may require that the device transmit and receive data to and from one or more computing devices such as a server or other user's computing device. For example, an application may be downloaded from a server to a mobile device 112. Upon installation, the mobile device 112 may communicate with a server.

One or more embodiments of the systems disclosed herein may utilize streaming technology. Streaming data enables data to be presented to the user of the client device while the client device receives data from the server. Streaming data from servers to client devices (e.g., computing devices operated by users) over a network is typically limited by the bandwidth of the network, or alternatively, the physical layer net bitrate. Traditional streaming protocols, such as RTSP (Real-Time Streaming Protocol), MS-WMSP (Windows Media HTTP Streaming Protocol), and RTMP (Real-Time Messaging Protocol) may be implemented, which essentially send data in small packets from the server to the client device in real-time at the encoded bitrate of the data. Adaptive streaming may also be implemented. Adaptive streaming almost exclusively relies on HTTP for the transport protocol. Similar to traditional streaming, data is encoded into discrete packets of a particular size; however, the source data is encoded at multiple bitrates rather than a single bitrate. The data packets corresponding to the same data encoded at different bitrates are then indexed based on the bitrate in memory. This streaming method works by measuring, in real-time, the available bandwidth and computer capacity of the client device, and adjusts which indexed data packet to transfer based on the encoded bitrate.

One or more aspects of the systems disclosed herein may be located on (i.e., processed, stored, executed, or the like; or include one or more hardware or software components) a single computer system or may be distributed among a plurality of computer systems attached by one or more communication networks (e.g., Internet, intranet, a telecommunications network, and the like). One or more components of a computer system may be distributed across one or more computer systems in communication with the computer system over a communication network. For example, in some embodiments, the systems disclosed herein may utilize one or more servers (i.e., one or more computer systems dedicated for a particular purpose in the system)

that may be dedicated to serve the needs of one or more other computer systems or components across a communication network and/or system bus. The one or more servers may provide a central processing location for one or more aspects of the systems disclosed herein.

As disclosed herein, a processor or hardware processor may refer to any hardware processor or software processor. A software processor may include or otherwise constitute an interpreter that is executed by a corresponding hardware processor. A computer system according to any embodiment disclosed herein is configured to perform any of the described functions related to the various embodiments of the systems disclosed herein.

As disclosed herein, any method, function, step, feature, or result may be considered a module that may include software instructions that cause, when executed by a computing device, the desired method, function, step, feature, or result. Executed by a computing device includes execution by any hardware component (e.g., CPU, GPU, network interface, integrated circuits, other hardware components, and the like) of the computing device such as a hardware processor. Any module may be executed by a computing device (e.g., by a processor of the computing device). Any method, function, step, feature, result, and the like disclosed herein may be implemented by one or more software modules whether explicitly described or not. Individual components within a computing device may work together to accomplish a desired method, function, step, feature, or result. For example, a computing device may receive data and process the data. A simple example would be that a network interface receives the data and transmits the data over a bus to a processor.

Various aspects of the systems disclosed herein may be implemented as software executing in a computer system. The computer system may include a central processing unit (i.e., a hardware processor) connected to one or more memory devices, a graphical processing unit, input devices such as a mouse and keyboard, output devices such as speakers and a display, a network interface to connect to one or more other computer systems (e.g., one or more computer systems configured to provide a service such that function as a database), an operating system, a compiler, an interpreter (i.e., a virtual machine), and the like. The memory may be used to store executable programs and data during operation of the computer system. The executable programs may be written in a high-level computer programming language, such as Java or C++. Of course, other programming languages may be used since this disclosure is not limited to a specific programming language or computer system. Further, it is to be appreciated that the systems and methods disclosed herein are not limited to being executed on any particular computer system or group of computer systems.

Some methods, functions, steps, or features have been described as being executed by corresponding software by a processor. It is understood than any methods, functions, steps, features, or anything related to the systems disclosed herein may be implemented by hardware, software (e.g., firmware), or circuits despite certain methods, functions, steps, or features having been described herein with reference to software corresponding thereto that is executable by a processor to achieve the desired method, function, or step. It is understood that software instructions may reside on a non-transitory medium such as one or more memories accessible to one or more processors in the systems disclosed herein. For example, where a computing device receives data, it is understood that the computing device processes that data whether processing the data is affirmatively stated or not. Processing the data may include storing the received data, analyzing the received data, and/or processing the data to achieve the desired result, function, method, or step. It is further understood that input data from one computing device or system may be considered output data from another computing device or system, and vice versa. It is yet further understood that any methods, functions, steps, features, results, or anything related to the systems disclosed herein may be represented by data that may be stored on one or more memories, processed by one or more computing devices, received by one or more computing devices, transmitted by one or more computing devices, and the like.

The foregoing description, for purposes of explanation, uses specific nomenclature and formula to provide a thorough understanding of the disclosed embodiments. It should be apparent to those of skill in the art that the specific details are not required in order to practice the invention. The embodiments have been chosen and described to best explain the principles of the disclosed embodiments and its practical application, thereby enabling others of skill in the art to utilize the disclosed embodiments, and various embodiments with various modifications as are suited to the particular use contemplated. Thus, the foregoing disclosure is not intended to be exhaustive or to limit the invention to the precise forms disclosed, and those of skill in the art recognize that many modifications and variations are possible in view of the above teachings.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the breadth and scope of a disclosed embodiment should not be limited by any of the above-described exemplary embodiments, but should be defined only in accordance with the following claims and their equivalents.

The invention claimed is:

1. An intelligent battery charging system comprising:
   a memory, the memory arranged to store an intelligent battery controller system, the intelligent battery controller system executable by a processor, wherein the intelligent battery controller system is in communication with a device state sensor, a battery temperature sensor, one or more current sensors, and a battery charge level sensor;
   the intelligent battery controller system being configured to:
     monitor, via the device state sensor, a present device state of a mobile device out of a plurality of device states, identify the present device state of the mobile device, and apply an associated charging current profile out of a plurality of charging current profiles that is associated with the identified present device state;

monitor, via the one or more current sensors, a charging current being received at a battery of the mobile device, a power drive current being received at a processor of the mobile device, and a power supply current being received at the mobile device from an external power source;

monitor, via the battery temperature sensor, a temperature of the battery of the mobile device and apply one or more of a plurality of remedial actions to lower the temperature of the battery when a battery temperature above a threshold temperature is measured; and monitor, via the battery charge level sensor, a percentage charge level of the battery and apply a charge mapping scheme that (1) indicates to a user that the percentage charge level is 0% when the charge level is actually a predefined lower threshold that is higher than 0% and (2) indicates to the user that the percentage charge level is 100% when the charge level is actually a predefined upper threshold that is lower than 100%.

2. The system of claim 1, wherein the plurality of device states includes device state- idle, device state-active viewing, device state-active USB transfer, device state-active WiFi streaming, or combinations thereof.

3. The system of claim 1, wherein each device state of the mobile device out of the plurality of device states has a different level of the power drive current associated with an active function of the present device state.

4. The system of claim 3, wherein the plurality of charging current profiles each have a different level of the power drive current that is received at the processor, and wherein the plurality of charging current profiles each have an equal charging current that is received at the battery.

5. The system of claim 1, wherein the plurality of remedial actions to lower the temperature of the battery include: charging the battery of the mobile device to a lower charge percentage than 100%, stopping a charging of the battery of the mobile device while still maintaining the power drive current to support presently active functions of the mobile device, disabling all external communications while still supporting presently active internal functions of the mobile device, shutting down the mobile device, or combinations thereof.

6. The system of claim 5, wherein the system monitors a temperature of the battery after instituting the remedial action, waits for the temperature to drop a predetermined number of degrees, and then reverses the remedial action.

7. The system of claim 6, wherein the predetermined number of degrees is in a range from one to five degrees.

8. The system of claim 1, wherein the predefined lower threshold is in the range of 5% to 15%.

9. The system of claim 1, wherein the predefined lower threshold is 10%.

10. The system of claim 1, wherein the predefined upper threshold is in the range of 85% to 95%.

11. The system of claim 1, wherein the predefined upper threshold is 90%.

12. The system of claim 1, wherein the percentage charge level mapping scheme shuts down the mobile device when the percentage charge level reaches the predefined lower threshold.

13. The system of claim 1, wherein the percentage charge level mapping scheme halts charging when the percentage charge level reaches the predefined upper threshold.

14. An intelligent battery charging method comprising:
monitoring, via a device state sensor, a present device state of a mobile device;
identifying the present device state of the mobile device;
applying an associated charging current profile to a battery, the associated charging current profile being associated with the identified present device state;
monitoring, via one or more current sensors, a charging current being received at the battery of the mobile device, a power drive current being received at a processor of the mobile device, and a power supply current being received at the mobile device from an external power source;
ensuring that the charging current being received at the battery matches the applied charging current profile;
monitoring, via a battery temperature sensor, a temperature of the battery for the mobile device;
applying one or more of a plurality of remedial actions to lower the temperature of the battery when a battery temperature above a threshold temperature is measured; and
monitoring, via a battery charging sensor, a percentage charge level of the battery; and
applying a percentage charge level mapping scheme that indicates to a user that (1) the percentage charge level is 0% when the percentage charge level is actually a predefined lower threshold that is higher than 0% and (2) the percentage charge level is 100% when the percentage charge level is actually a predefined upper threshold that is lower than 100%.

15. The method of claim 14, further comprising: operating the mobile device in a present device state selected from a plurality of device states that include device state-idle, device state-active viewing, device state-active USB transfer, device state-active WiFi streaming, or combinations thereof.

16. The method of claim 15, further comprising: operating the mobile device in a present device state out of the plurality of device states that has a level of the power drive current associated with an active function of the present device state.

17. The method of claim 16, wherein the plurality of charging current profiles each have a different level of the power drive current that is received at the processor, and wherein the plurality of charging current profiles each have an equal charging current that is received at the battery.

18. The method of claim 14, wherein the plurality of remedial actions to lower the temperature of the battery include: charging the battery of the mobile device to a lower charge percentage than 100%, stopping a charging of the battery of the mobile device while still maintaining the power drive current to support presently active functions of the mobile device, disabling all external communications while still supporting presently active internal functions of the mobile device, shutting down the mobile device, or combinations thereof.

19. The method of claim 18, wherein the system monitors a temperature of the battery after instituting the remedial action, waits for the temperature to drop a predetermined number of degrees, and then reverses the remedial action.

20. The method of claim 14, wherein the predefined lower threshold is in the range of 5% to 15%.

21. The method of claim 14, wherein the predefined upper threshold is in the range of 85% to 95%.

22. The method of claim 14, wherein the percentage charge level mapping scheme shuts down the mobile device when the percentage charge level of the battery reaches the predefined lower threshold.

23. The method of claim 14, wherein the percentage charge level mapping scheme halts charging of the battery when the percentage charge level reaches the predefined upper threshold.

24. An intelligent battery charging system comprising:
a memory, the memory arranged to store an intelligent battery controller system, the intelligent battery controller system executable by a processor, wherein the intelligent battery controller system is in communication with a device state sensor, a battery temperature sensor, and one or more current sensors;
the intelligent battery controller system being configured to:
monitor, via the device state sensor, a present device state of a mobile device out of a plurality of device states, identify the present device state of the mobile device, and apply an associated charging current profile out of a plurality of charging current profiles that is associated with the identified present device state;
monitor, via the one or more current sensors, a charging current being received at a battery of the mobile device, a power drive current being received at a processor of the mobile device, and a power supply current being received at the mobile device from an external power source; and
monitor, via the battery temperature sensor, a temperature of the battery of the mobile device and apply one or more of a plurality of remedial actions to lower the temperature of the battery when a battery temperature above a certain threshold is measured,
wherein the plurality of remedial actions to lower the temperature of the battery include: stopping a charging of the battery of the mobile device while still maintaining the power drive current to support presently active functions of the mobile device, disabling all external communications while still supporting presently active internal functions of the mobile device, and shutting down the mobile device.

25. The system of claim 24, wherein the system monitors a temperature of the battery after instituting the remedial action, waits for the temperature to drop a predetermined number of degrees, and then reverses the remedial action.

* * * * *